(12) United States Patent
Waggle et al.

(10) Patent No.: US 8,905,684 B2
(45) Date of Patent: Dec. 9, 2014

(54) SLOTTING CUTTER, CUTTING INSERT AND TOOL THEREFOR

(75) Inventors: James Michael Waggle, Derry, PA (US); Kevin Michael Gamble, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 302 days.

(21) Appl. No.: 13/531,094

(22) Filed: Jun. 22, 2012

(65) Prior Publication Data

US 2013/0343825 A1 Dec. 26, 2013

(51) Int. Cl.
*B23C 5/08* (2006.01)
*B23C 5/22* (2006.01)

(52) U.S. Cl.
USPC ............................. 407/110; 407/109

(58) Field of Classification Search
CPC ........ B23B 2205/02; B23B 27/16; B23C 5/08
USPC .................. 407/117, 109, 110, 107
See application file for complete search history.

(56) References Cited

U.S. PATENT DOCUMENTS

| | | | | |
|---|---|---|---|---|
| 195,699 | A * | 10/1877 | Burger | 83/843 |
| 361,142 | A * | 4/1887 | Dalton | 83/836 |
| 402,400 | A * | 4/1889 | Cook | 76/80 |
| 3,653,107 | A * | 4/1972 | Hertel | 407/86 |
| 4,738,570 | A * | 4/1988 | Wertheimer | 407/50 |
| 4,992,007 | A * | 2/1991 | Satran | 407/110 |
| 5,035,545 | A | 7/1991 | Zinner | |
| 5,799,554 | A * | 9/1998 | Friedman et al. | 82/160 |
| 5,803,675 | A | 9/1998 | Von Haas | |
| 5,829,924 | A * | 11/1998 | Oshnock et al. | 407/110 |
| 5,980,165 | A * | 11/1999 | Hansson et al. | 407/107 |
| 6,065,906 | A * | 5/2000 | Hansson | 407/110 |
| 6,116,823 | A | 9/2000 | Mihic | |
| 6,176,649 | B1 | 1/2001 | Friedman | |
| 6,234,727 | B1 | 5/2001 | Barazani | |
| 6,241,429 | B1 | 6/2001 | Schafer et al. | |
| 6,428,247 | B1 * | 8/2002 | Friedman | 407/110 |
| 6,572,309 | B2 | 6/2003 | Hansson et al. | |
| 6,742,971 | B2 * | 6/2004 | Tong | 407/117 |
| 7,866,924 | B2 | 1/2011 | Nagaya et al. | |
| RE43,534 | E * | 7/2012 | Friedman | 82/160 |
| 8,388,270 | B2 * | 3/2013 | Waggle et al. | 407/49 |
| 8,695,189 | B2 * | 4/2014 | Hecht | 29/267 |
| 2009/0000454 | A1 | 1/2009 | Beemthaler et al. | |
| 2011/0255926 | A1 * | 10/2011 | Hecht | 407/66 |

* cited by examiner

*Primary Examiner* — Andrea Wellington
*Assistant Examiner* — Sara Addisu
(74) *Attorney, Agent, or Firm* — Larry R. Meenan, Esq.

(57) ABSTRACT

A slotting cutter includes a disc-like cutter body rotatable in a predetermined direction on a central axis perpendicular to a plane of the cutter body. The cutter body includes a stop slot, an upper cam slot and a lower slot. A plurality of pockets adapted to receive a cutting inset are formed about a perimeter of the body. A cantilevered clamping member includes a bottom surface with a pair of clamping surfaces that engage a pair of angled clamping surfaces on a top surface of the cutting insert during operation. A wrench is provided to lift the cantilevered clamping member for inserting, indexing or removing the cutting insert from the slotting cutter. The wrench includes two fixed pins and a floating pin that prevents the cantilevered clamping member from bending too far and limiting the useful life of the slotting cutter.

13 Claims, 15 Drawing Sheets

SLOTTING CUTTER, CUTTING INSERT AND TOOL THEREFOR

BACKGROUND OF THE INVENTION

Slotting cutters are known for cutting keyways and the like and, also, for providing work members with slots of various width. Slotting cutters are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work in the radial direction.

In order to form slots rapidly and efficiently, it is desirable that the cutting inserts be solidly supported in the cutter body and have adequate clearance between the cutting edges of the inserts and the cutter body as the material is removed from the work piece. With the inserts solidly supported and having sufficient clearance between the cutter body and the cutting edges, the slotting cutter is able to withstand substantial loads and can cut extremely rapidly, freely and accurately.

Most slotting cutters clamp the insert in the cutter body by means of an insert pocket with a "saw-cut" clamp design, and an insert with a slight taper angle. This "saw-cut" design allows for the insert pocket area to spread open when the insert is seated, which creates a spring-type taper clamping effect on the insert. In order for the slotting cutter to have minimal radial run-out, an additional seating surface feature is usually added to the pocket area. This seating surface creates a positive stop, which minimizes the accumulated radial run-out that could exist without this feature. This seating surface also distributes the radial cutting forces into the slotting cutter body, which in turn keeps the insert pocket from spreading open even further.

The existing pocket designs are completely dependent on the spring ability of the cutter body to securely clamp the insert, and does not allow for pocket wear or manufacturing dimensional variations of the insert and pocket. It has been observed with existing pocket designs that the cutting insert has a tendency to move in the pocket during cutting operations.

SUMMARY OF THE INVENTION

The problem of minimizing movement of the cutting insert in the pocket during cutting operations has been solved by providing an angled clamping surface on the top surface of the cutting insert that cooperates with a cantilevered member of the cutter body having progressively larger radii forming a spiral shape to distribute stress encountered by the cutting insert during cutting operations.

In one aspect of the invention, a slotting cutter comprises a disc-like cutter body rotatable in a predetermined direction on a central axis perpendicular to a plane of the cutter body. A plurality of cutting pockets are formed about a perimeter of the body. A cutting insert is replaceably mounted in one of the plurality of pockets, the cutting insert including an angled clamping surface on a top surface of the cutting insert. A cantilevered member is disposed adjacent the top surface of the cutting insert when the cutting insert is mounted in one of the plurality of pockets, the cantilevered member having progressively larger radii forming a spiral shape. The angled clamping surface on the top surface of the cutting insert engages the cantilevered member of the cutter body to distribute stress encountered by the cutting insert during cutting operations.

In one embodiment, a slotting cutter comprises a disc-like cutter body rotatable in a predetermined direction on a central axis perpendicular to a plane of the cutter body, the cutter body also includes an upper cam slot defined by a pair of opposing lower and upper surfaces, a lower slot defined by a pair of opposing lower and upper surfaces, and a stop slot disposed between the upper cam slot and the lower slot and defined by a pair of opposing, curved lower and upper surfaces, each slot adapted to engage a wrench; and a cantilevered clamping member having a bottom surface adapted to engage clamping surfaces on a top surface of a cutting insert when the cutting insert is mounted in a pocket of the slotting cutter.

In another embodiment, a cutting insert for a slotting cutter comprises a top surface, a bottom surface and a plurality of side surfaces; a first cutting edge formed at the intersection between a rake surface on the top surface and one of the side surfaces, and a second cutting edge formed at the intersection between a rake surface on the top surface and another one of the side surfaces, wherein the top surface of the cutting insert including a first pair of clamping surfaces angled toward each other, and a second pair of clamping surfaces angled toward each other, the first and second pair of clamping surfaces sloping downward from a central portion toward a respective cutting edge, and wherein the clamping surfaces are contacted by clamping surfaces of a cantilevered clamping member of a slotting cutter, thereby clamping the cutting insert into a pocket of the slotting cutter.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
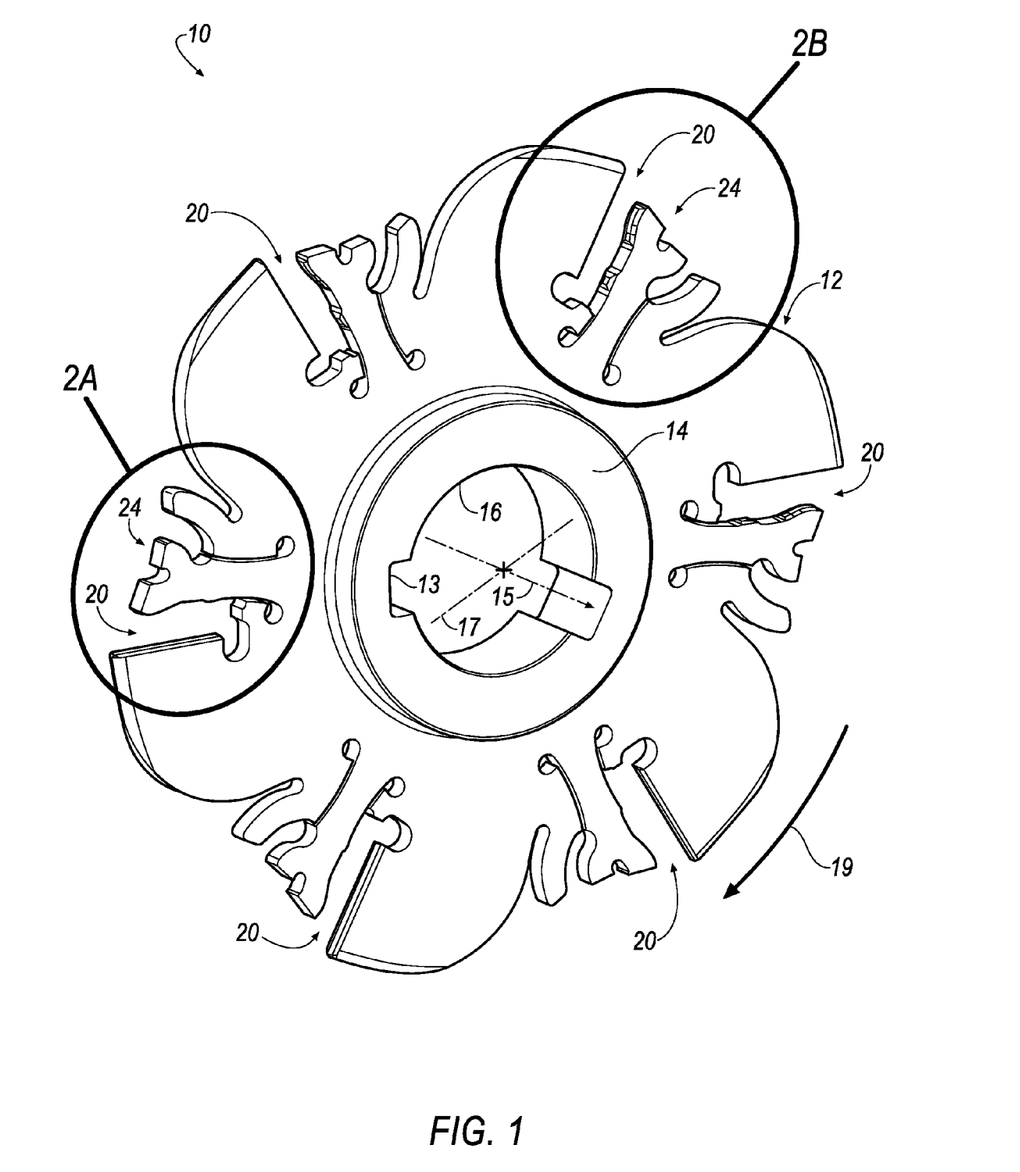
FIG. 1 is a perspective view of a slotting cutter according to an embodiment of the invention.
Figure 2A:
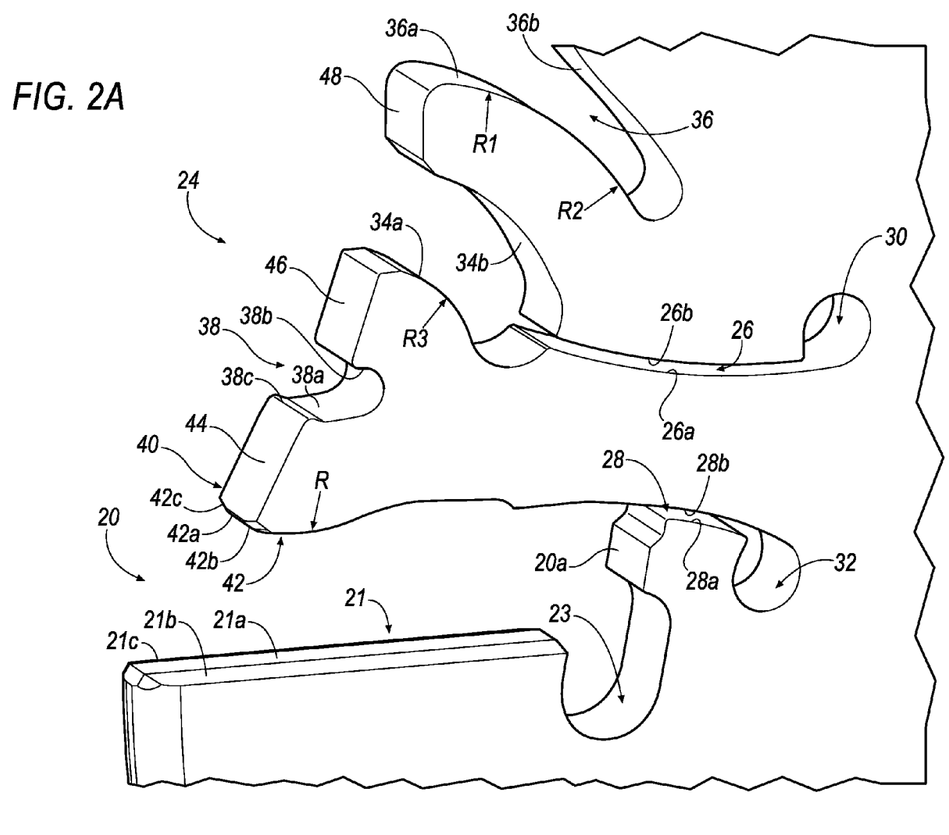
FIG. 2A is an enlarged partial perspective view side view of the slotting cutter of FIG. 1 showing a pocket, a cantilevered clamping member, stop slot, upper cam slot and lower slot.
Figure 2B:
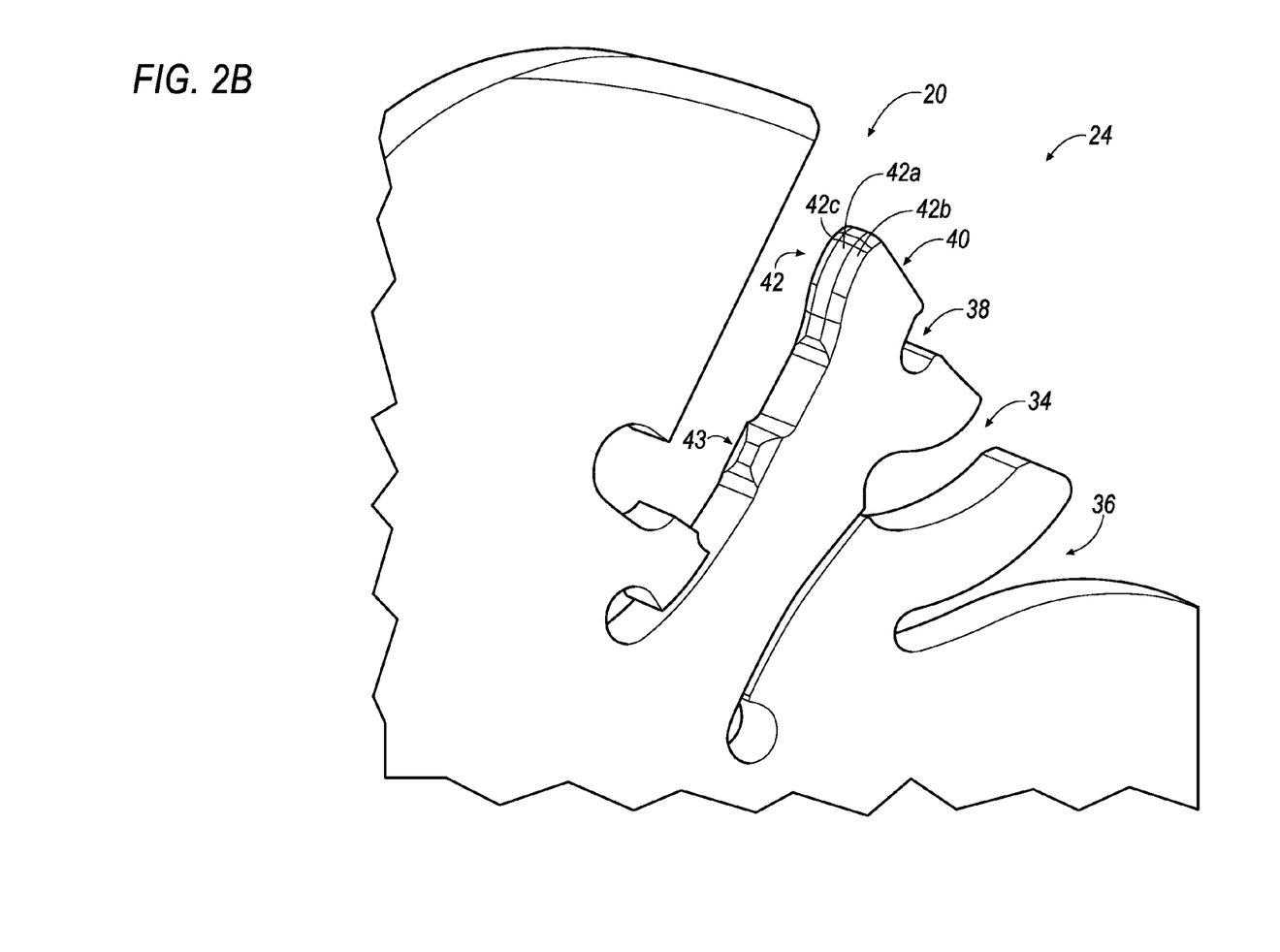
FIG. 2B is another enlarged partial perspective view side view of the slotting cutter of FIG. 1 showing a pocket, a cantilevered clamping member, stop slot, upper cam slot and lower slot.

Referring now to FIGS. 1, 2A and 2B, a slotting cutter 10 is shown according to an embodiment of the invention. The slotting cutter 10 includes a disc-like cutter body 12 having a central hub region 14 that is provided with a bore 16 for receiving a support shaft. The slotting cutter 10 rotates on a central axis 15 perpendicular to a plane 17 of the cutter body 12 in a predetermined direction (indicated by the arrow 19). The central hub region 14 may also be provided with an optional keyway (13) for receiving a drive key (not shown).

Figure 5:
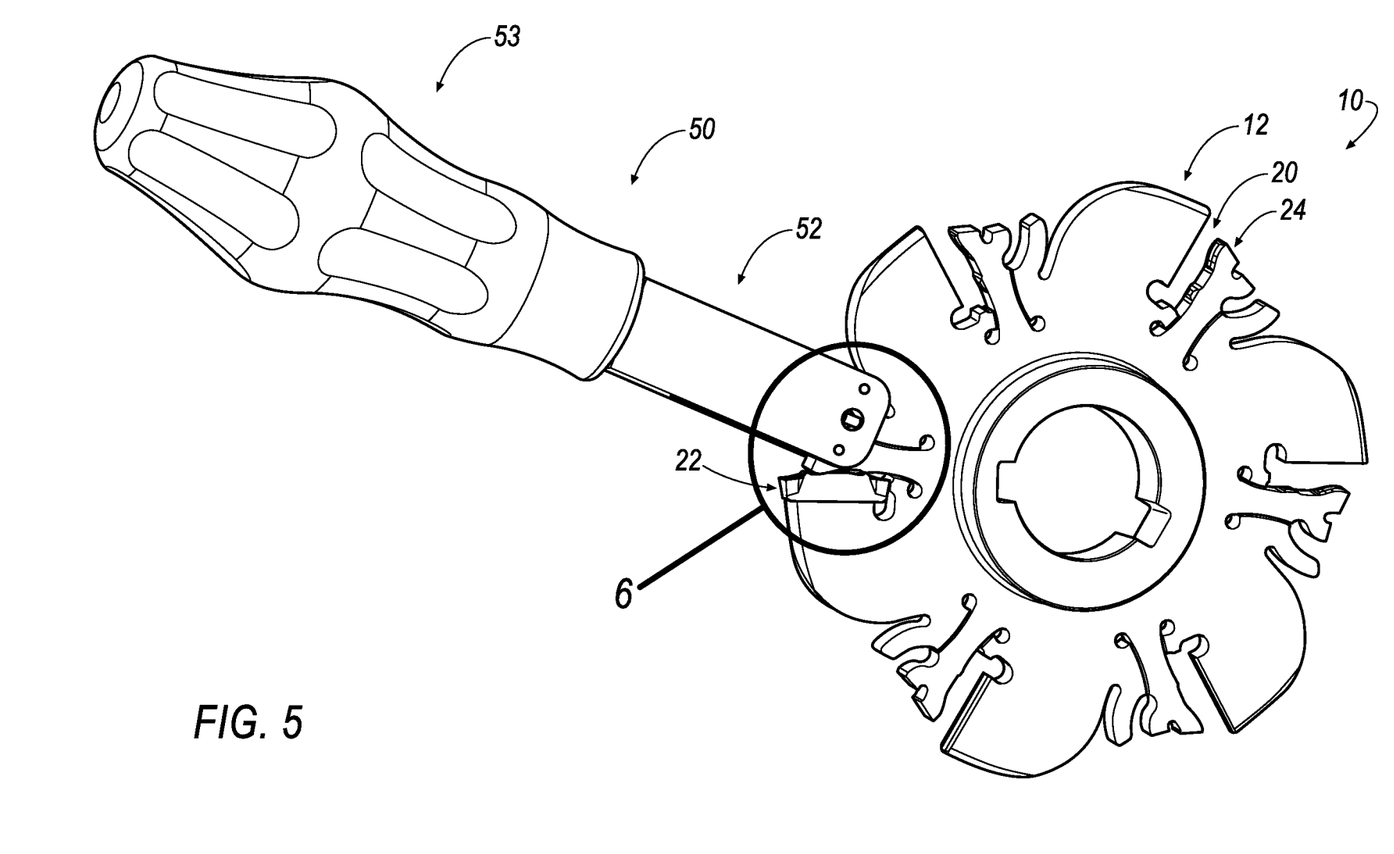
FIG. 5 is a side view of the slotting cutter, cutting insert and wrench of the invention in an initial position.
Figure 6:
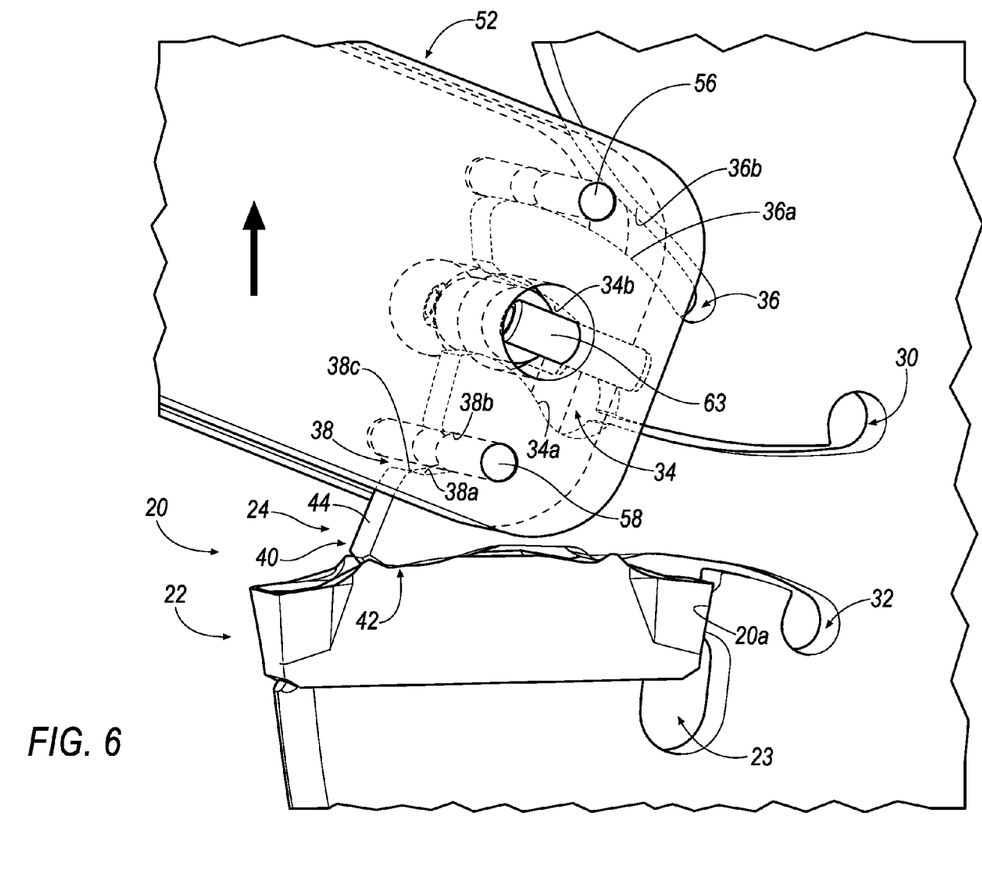
FIG. 6 is an enlarged partial side view of the slotting cutter, cutting insert and wrench in the initial position of FIG. 5.

The slotting cutter 10 is provided with a plurality of pockets 20 formed about the perimeter of the slotting cutter 10 that are capable of receiving a cutting insert 22 (FIGS. 5 and 6). In FIGS. 1, 2A and 2B, the cutting insert 22 is not shown in the slotting cutter 10 for clarity. It will be appreciated that most any suitable number of pockets 20 may be formed about the perimeter of the cutter body 12, depending on the desired material of the work piece to be cut and the diameter of the cutter body 12. In the illustrated embodiment, the slotting cutter 10 includes six (6) pockets 20 equally spaced about the perimeter of the cutter body 12.

Each pocket 20 is defined by a rearward surface 20a, a seating surface 21 and a corner pocket relief 23 at the intersection between the rearward surface 20a and the seating surface 21. The rearward surface 20a is a seating surface that acts as a stop for the cutting insert 22 to prevent further inward radial movement of the cutting insert 22 when mounted in the pocket 20. The seating surface 21 is complementary in shape to at least one of the top and bottom surfaces of the cutting insert 22. For example, the seating surface 21 can be complementary in shape to the bottom surface of the cutting insert 22. In the illustrated embodiment, the seating surface 21 includes a substantially flat central surface 21a and a pair of angled seating surfaces 21b, 21c (only surface 21b is clearly visible in FIG. 2A). In another embodiment, the seating surface 21 is substantially V-shaped in which the central surface 21a is omitted.

One aspect of the invention is that the slotting cutter 10 includes a cantilevered clamping member 24 that is generally dog bone-shaped and disposed adjacent each pocket 20 for engaging the cutting insert 22 in such a way that the cutting insert 22 is securely held its respective pocket 20 of the slotting cutter 10.

As shown in FIGS. 2A and 2B, the cantilevered clamping member 24 is formed by cutting a pair of slots 26, 28 in the cutter body 12. The slot 26 is defined by a pair of opposing surfaces 26a, 26b, and the slot 28 is defined by a pair of opposing surfaces 28a, 28b. In the radially inward direction (toward the central hub region 14), each slot 26, 28 terminates in a rounded recess 30, 32 that provides stress relief for the cantilevered clamping member 24. In the radially outward direction (away from the central hub region 14), the slot 26 terminates in a stop slot 34 defined by a pair of opposing, curved lower and upper surfaces 34a, 34b that are contacted by the floating stop-pin 60 of the wrench 50 to prevent excessive deflection of the cantilevered clamping member 24. It should be noted that the surface 34a of the stop slot 34 has a substantially constant radius.

The cutter body 12 also includes an upper cam slot 36 defined by a pair of opposing lower and upper surfaces 36a, 36b and a lower slot 38 defined by a pair of opposing lower and upper surfaces 38a, 38b. Each slot 36, 38 is capable of receiving a respective pin of the wrench of the invention. The lower slot 38 is generally hook-shaped that includes a ridge 38c at its radially outward end to act as a stop to prevent the pin 58 of the wrench 50 from accidentally slipping out of the lower slot 38 during use.

It should be noted that the surface 36a of the upper cam slot 36 has a radius that increases radially inward from the periphery of the cutter body 12, unlike the surface 34a of the stop slot 34 that has a substantially constant radius. In other words, the radius, R1, of the surface 36a that is radially outward is smaller than the radius, R2, of the surface 36a that is radially inward. As a result, the upper cam slot 36 has a spiral shape, which has been found through finite element analysis to help distribute the stress encountered with the slotting cutter 10 during operation. In addition, the spiral-shaped slot 36 enables the user to release the wrench 50 when inserting, indexing or removing the cutting insert 22 because wrench 50 is held in place due to friction, thereby freeing both hands of the user when inserting, indexing or removing the cutting insert 22.

In addition, the amount of travel of the pin of the wrench within the upper cam slot 36 required to remove or insert the cutting insert 22 can be selectively adjusted by increasing radius of the surface 36a of the upper cam slot 36. For example, in one embodiment, the wrench travels about thirty (30) degrees to cause the cantilevered clamping member 24 to travel about 0.010-0.015 inches (0.254-0.381 mm) during operation.

The cantilevered member 24 includes a nose portion 40 having a curved bottom surface 42 formed with a radius, R, for engaging the top surface of the cutting insert 22 to securely hold the cutting insert 22 in place. As discussed below, the bottom surface 42 of the cantilevered member 24 interacts with the top surface 64, and in particular, with the clamping surfaces 64e, 64f or 64g, 64h of the cutting insert 22. It is noted that the bottom surface 42 of the cantilevered member 24 also defines the top surface of the pocket 20.

In one embodiment shown in FIG. 2A, 2B, the bottom surface 42 includes a substantially flat central portion 42a separating a pair of clamping surfaces 42b, 42c. In another embodiment, the bottom surface 42 is substantially V-shaped in which the central portion 42a is omitted. The clamping surfaces 42b, 42c act as a clamping surface for securing the cutting insert 22 in place. In addition to acting as a stop surface, the rearward surface 20a of the pocket 20 also acts as a clamping surface during operation.

The bottom surface 42 also includes a guide 43 disposed between the clamping surfaces 42b, 42c and the rounded recess 32. That is, the guide 43 is disposed radially inward with respect to the clamping surfaces 42b, 42c. In the illustrated embodiment, the guide 43 is in the form of a truncated pyramid to help guide the cutting insert 22 when inserting, removing or indexing the cutting insert 22 in the pocket 20.

The cutter body 12 further includes one or more chip clearance surfaces on its outer peripheral surface to prevent damage to the cutter body 12 by chips produced by the cutting insert 22. In the illustrated embodiment, the cutter body 12 includes a first chip clearance surface 44 on its outer periphery between the insert pocket 20 and the lower slot 38. In addition, the cutter body 12 includes a second chip clearance surface 46 on its outer periphery between the lower slot 38 and the stop slot 34. Further, the cutter body 12 includes a third chip clearance surface 48 on its outer periphery between the stop slot 34 and the upper cam slot 36.

Figure 3:
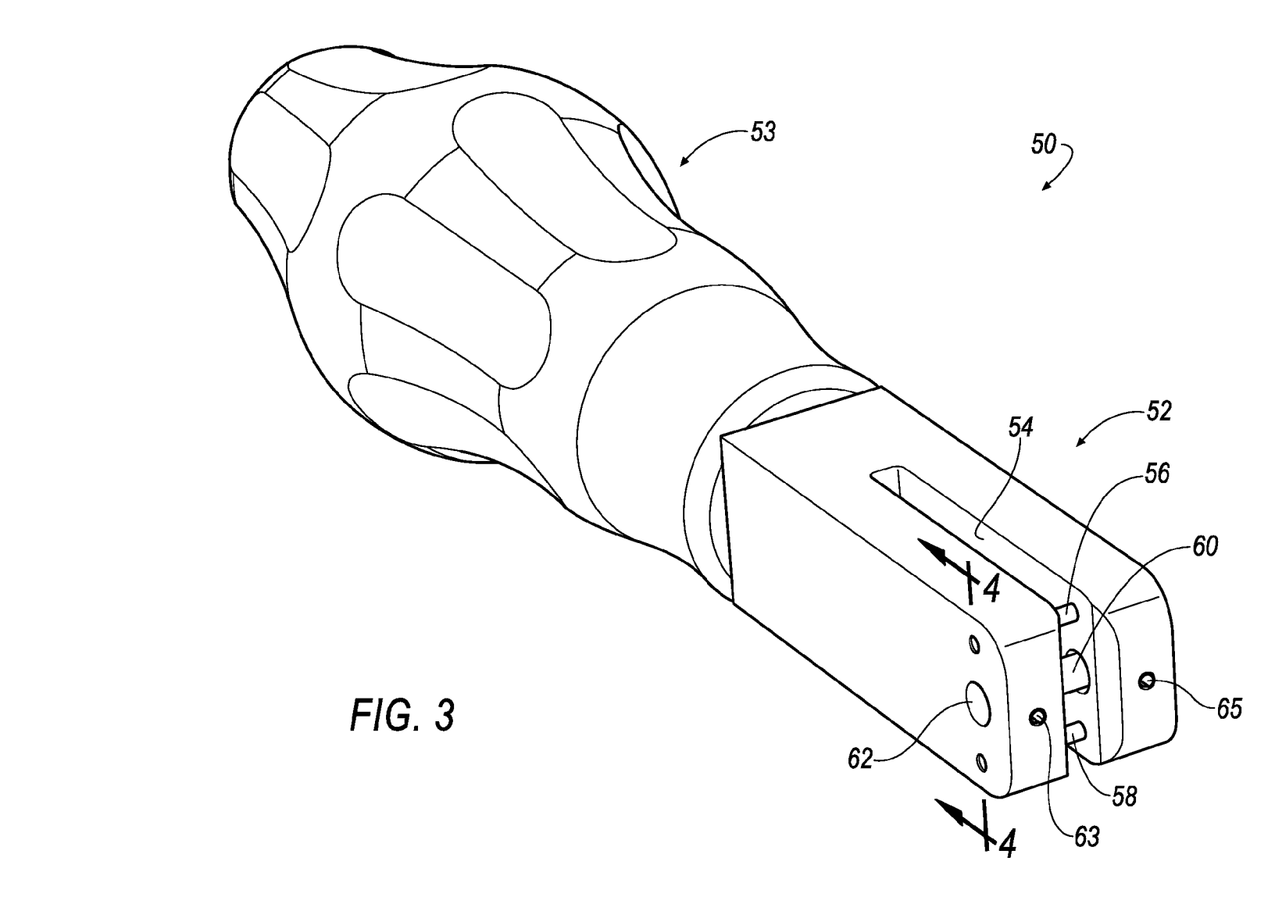
FIG. 3 is a perspective view of a wrench for removing, indexing or inserting a cutting insert into the pocket of the slotting cutter according to the invention.
Figure 4:
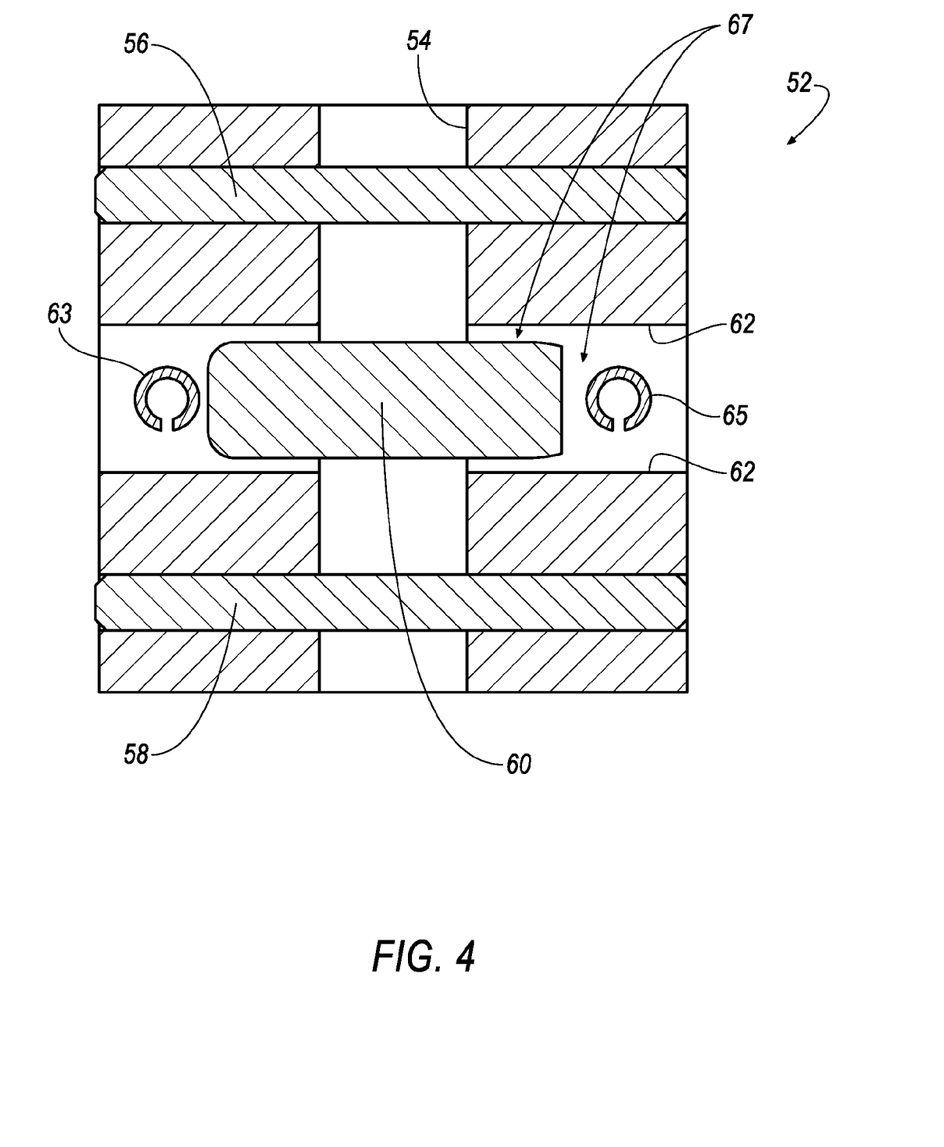
FIG. 4 is a cross section view of the head of the wrench taken along line 4-4 of FIG. 3.

In the illustrated embodiment, the cantilevered clamping member 24 is made of a material such that it is impossible to insert or remove the cutting insert 22 without the use of a tool, such as a wrench 50 shown in FIGS. 3 and 4.

The wrench 50 is designed to flex the cantilevered clamping member 24 of the cutter body 12, thereby opening the pocket 20 to insert, index, or replace the cutting insert 22. In general, the wrench 50 is symmetrically designed (non-handed) and includes a head portion 52 and a handle portion 53. The head portion 52 includes a slot 54 and two fixed pins 56, 58 extending through the slot 54. In the illustrated embodiment, the two fixed pins 56, 58 are substantially parallel to each other. The head portion 52 further includes a third, floating pin 60 encapsulated in the wrench 50 and installed through the slot 54 between the two fixed pin 56, 58. In one embodiment, the floating pin 60 is substantially parallel to the two fixed pins 56, 58. The floating pin 60 is prevented from exiting the bore 62 by a pair of stop pins 63, 65 at each end of the floating pin 60. The floating pin 60 is allowed to move freely in all directions within a bore 62 because of a gap 67 between the floating pin 60 and the head portion 52 and stop pins 63, 65, as shown in FIG. 4. In one embodiment, the diameter of the floating pin 60 is about 3.0 mm, while the diameter of the bore 62 is about 3.8 mm.

Figure 7:
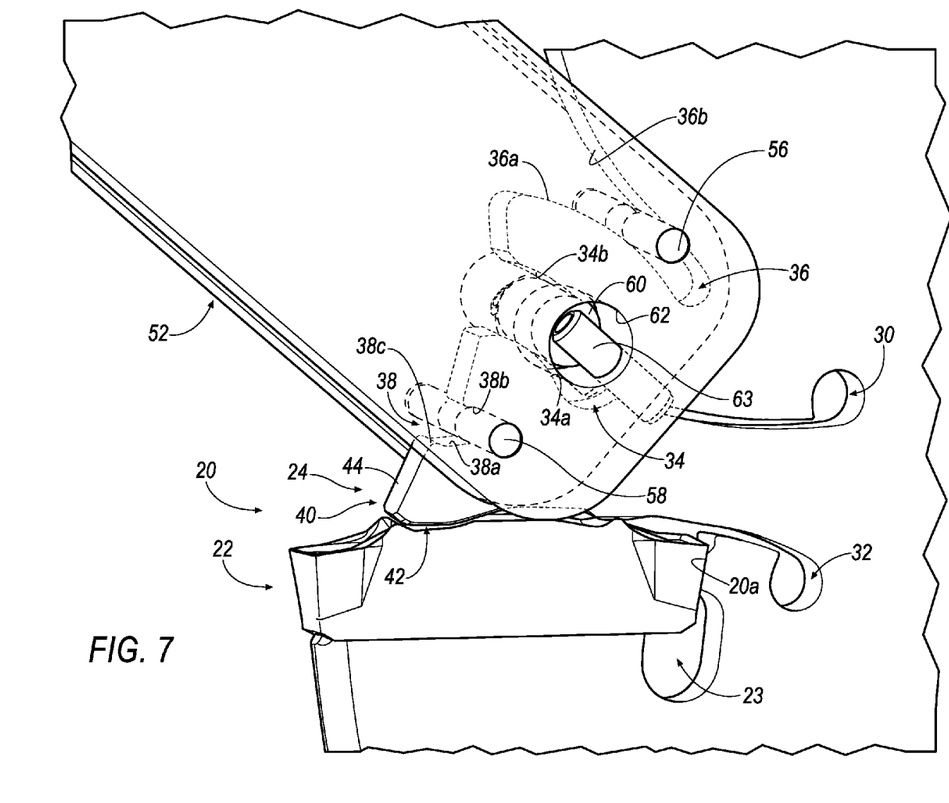
FIG. 7 is an enlarged partial side view of the slotting cutter, cutting insert and wrench in a final position in which the upper surface of the stop slot engages the floating pin of the wrench.
Figure 8:
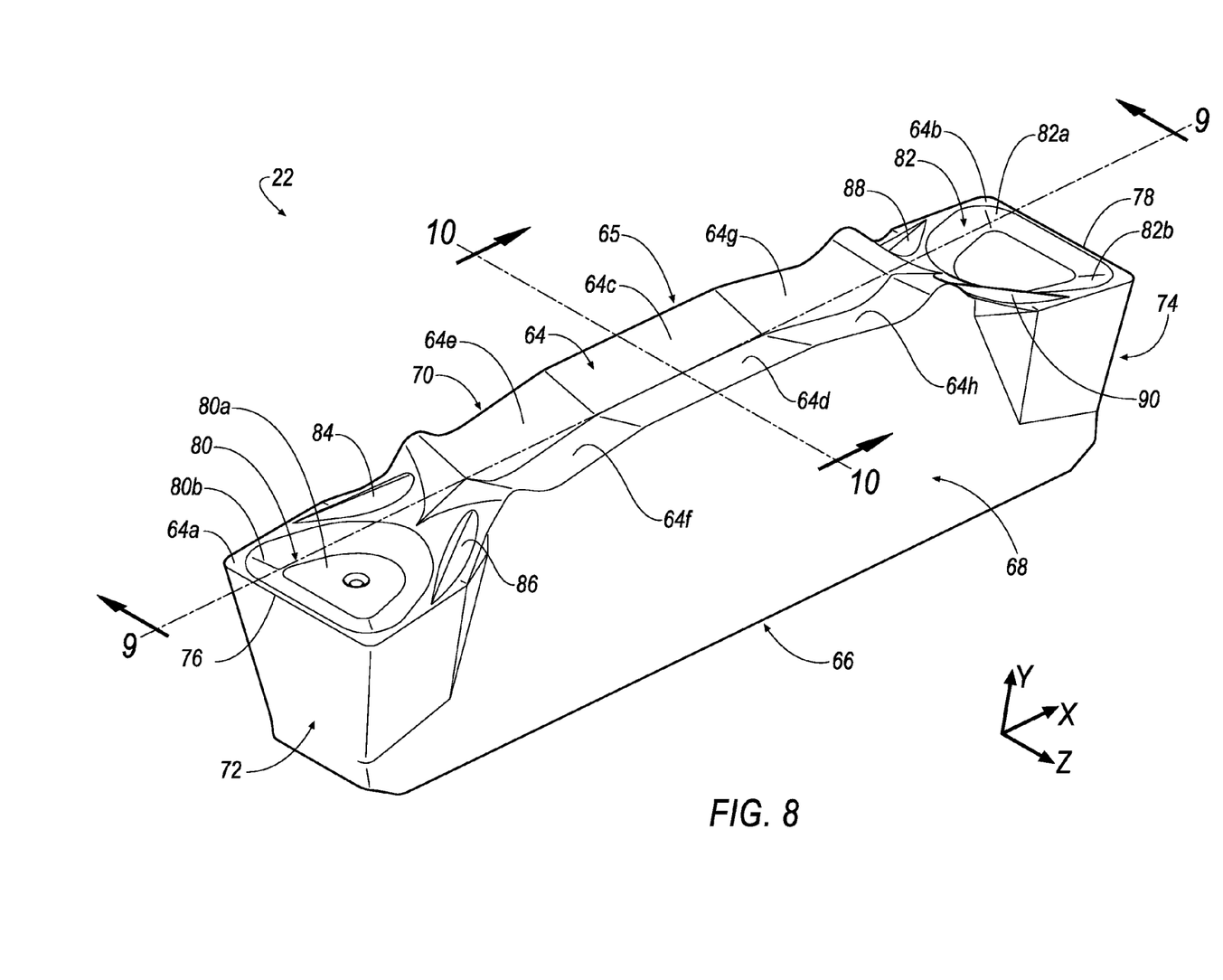
FIG. 8 is a perspective view of the cutting insert showing a top surface with a pair of angled clamping surfaces that engage the cantilevered clamping member of the slotting cutter according to the invention.

Referring now to FIGS. 5-7, the operation of the wrench 50 will now be described. In an initial position shown in FIG. 6, the wrench 50 is applied so that the fixed pin 56 is in an initial position engaging the surface 36a of the upper cam slot 36. In addition, the fixed pin 58 is engaging the surface 38b of the lower slot 38. Further, the floating pin 60 is in an initial position engaging the lower surface 34a of the stop slot 34. On turning the wrench 50 around its fulcrum formed by the pin 58 in the lower slot 38 (in the direction of the arrow in FIG. 6), the fixed pin 56 will slide along the curve shaped surface 36a having an increasing radius and the floating pin 60 will simultaneously slide along the curve shaped lower surface 34a of the stop slot 34. The fixed pin 56 will then with a lever effect lift the cantilevered clamping member 24 and thereby lift the nose portion 40 away from the seating surface 21. Because the radius of the upper cam slot 36 increases in the radially inward direction, the lever effect caused by the fixed pin 56 also increases as the fixed pin slides along the surface 36a. Eventually, the increase in the lever effect caused by the fixed pin 56 sliding along the surface 36a causes the upper surface 34b of the stop slot 34 to engage the floating pin 60, thereby preventing the floating pin 60 from sliding any further within the slot slot 34, as shown in FIG. 7. At this point, the operation of the wrench 50 is in a final position. As a result, any further travel of the wrench 50 is stopped, thereby preventing the cantilevered clamping member 24 from bending too far and limiting the usable life of the slotting cutter 10.

By allowing the upward lifting of the cantilevered clamping member 24 and the lifting of the nose portion 40 away from the seating surface 21, insertion, indexing and replacement of the cutting insert 22 can be performed. As mentioned above, the increasing radius of the surface 36a allows the user to release the wrench 50 after the cantilevered clamping member 24 has been lifted upward, thereby allowing the user to use both hands, if desired, to insert, index or replace the cutting insert 22. For example, the cutting insert 22 can be inserted by sliding the cutting insert 22 along the seating surface 21 until the surface 20a of the pocket 20 engages the cutting insert 22. Then, the wrench 50 can be turned back resulting in engagement between the nose portion 40 of the cantilevered clamping member 24 with the top surface of the cutting insert 22, thereby securely clamping the cutting insert 22 in the pocket 20 of the slotting cutter 10.

Referring now to FIGS. 8-14, the cutting insert 22 for use with the slotting cutter 10 and wrench 50 is capable of manufacturing narrow slots in various work piece materials that can be typically between 0.062 inches (1.575 mm) and 0.250 inches (6.35 mm) in width. In general, the cutting insert 22 is substantially symmetric about its longitudinal axis (x-axis) and its transverse axis (z-axis). The cutting insert 22 includes a top surface, shown generally at 64, a bottom surface, shown generally at 66, and side surfaces, shown generally at 68, 70, 72, 74. In the illustrated embodiment, the cutting insert 22 has a first cutting edge 76 formed at the intersection between a rake surface 64a on the top surface 64 and side surface 72, and a second cutting edge 78 formed at the intersection between a rake surface 64b on the top surface 64 and the side surface 74. Thus, the cutting insert 22 has two cutting edges 76, 78 that can be selectively presented to a working position by lifting the cantilevered clamping member 24, removing the cutting insert 22, and rotating the cutting insert 22 one-hundred eighty (180) degrees about a vertical axis (y-axis), and then again clamping the cutting insert 22 in the cutter body 12. However, it will be appreciated that the cutting insert 22 can be manufactured as both single and double-ended inserts with various end cutting shapes, including, but not limited to, radiused corners, full radii, "V" shaped forms, and the like.

The top surface 64 of the cutting insert 22 is generally V-shaped with a central portion 65 formed by a pair of surfaces 64c, 64d that are angled towards each other. That is, the surfaces 64c, 64d slope upwardly from the center of the cutting insert 22 toward the side surfaces 68, 70. The top surface 64 being generally V-shaped helps in centering the cutting insert 22 within the pocket 20 of the slotting cutter 10. It is noted that the edge at the intersection of the surfaces 64c, 64d and the side surfaces 68, 70, respectively, is substantially parallel to the longitudinal axis (x-axis), as shown in FIGS. 9 and 13.

The top surface 64 also includes a first pair of clamping surfaces 64e, 64f at one end of the surfaces 64c, 64d, and a second pair of clamping surfaces 64g, 64h at the other end of the surfaces 64c, 64d. Similar to the surfaces 64c, 64d, the clamping surfaces 64e, 64f are angled toward each other, and the clamping surfaces 64g, 64h are angled toward each other.

Figure 9:
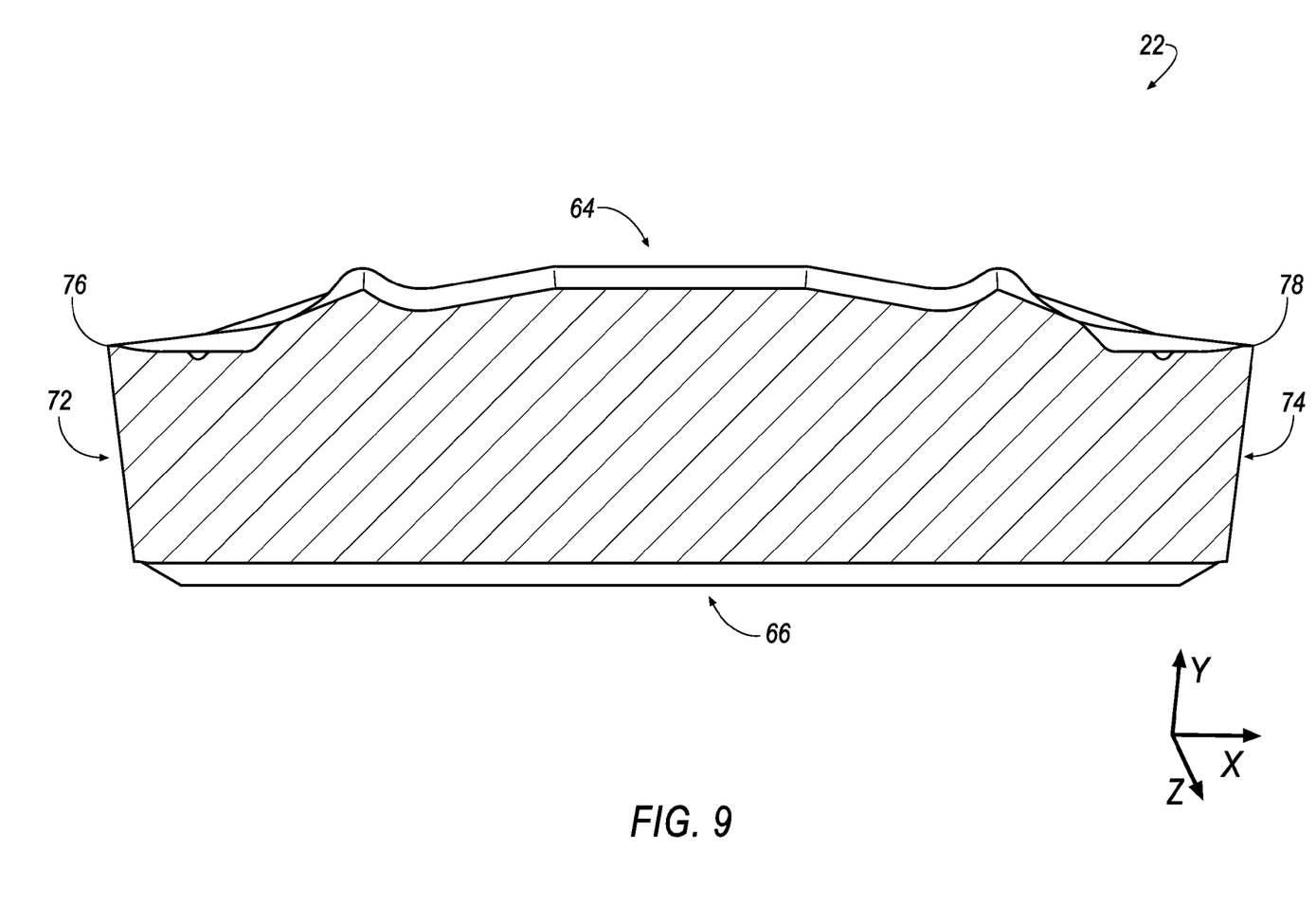
FIG. 9 is a cross section view of the cutting insert taken along line 9-9 of FIG. 8.
Figure 10:
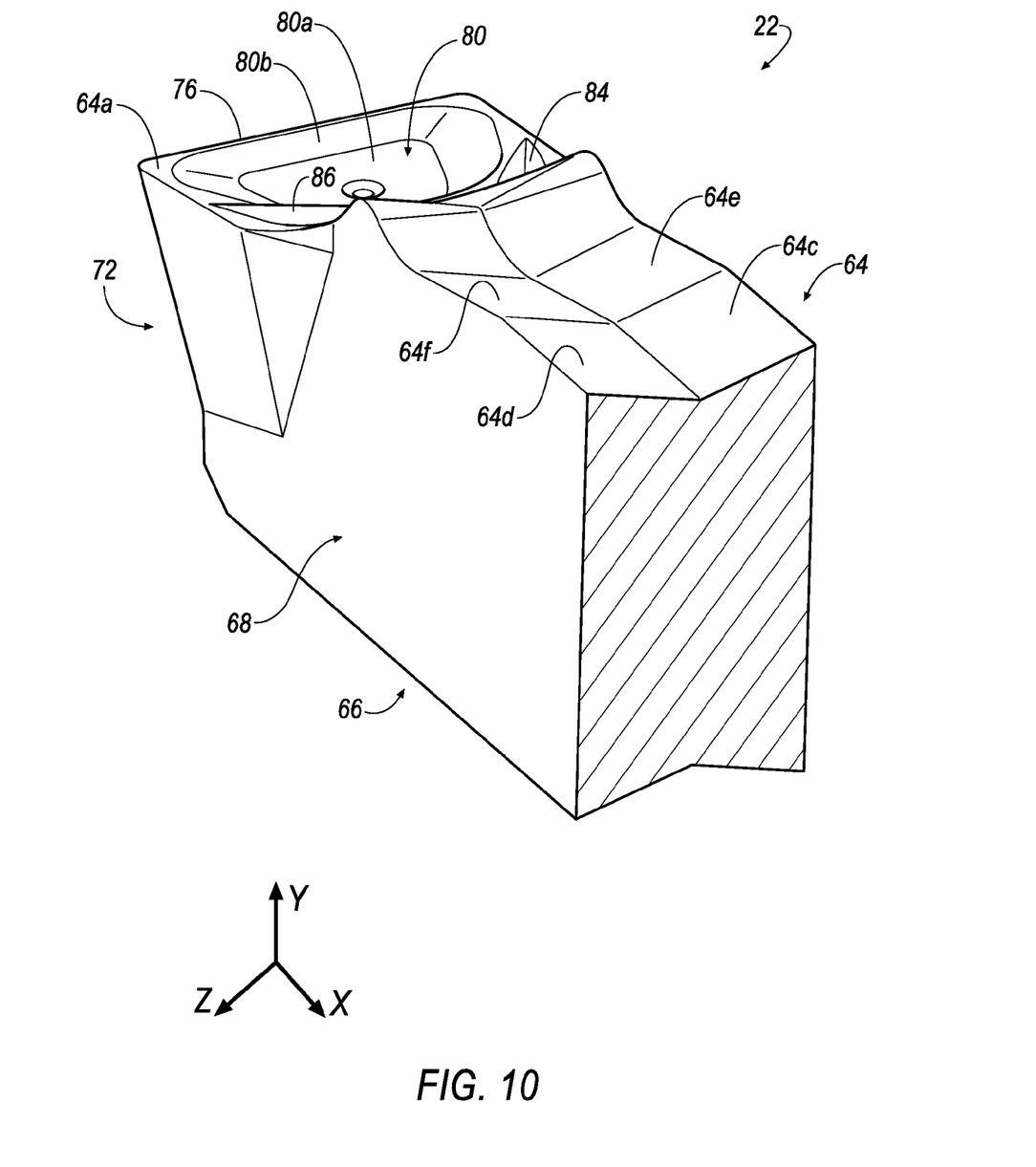
FIG. 10 is a cross section view of the cutting insert taken along line 10-10 of FIG. 8.
Figure 11:
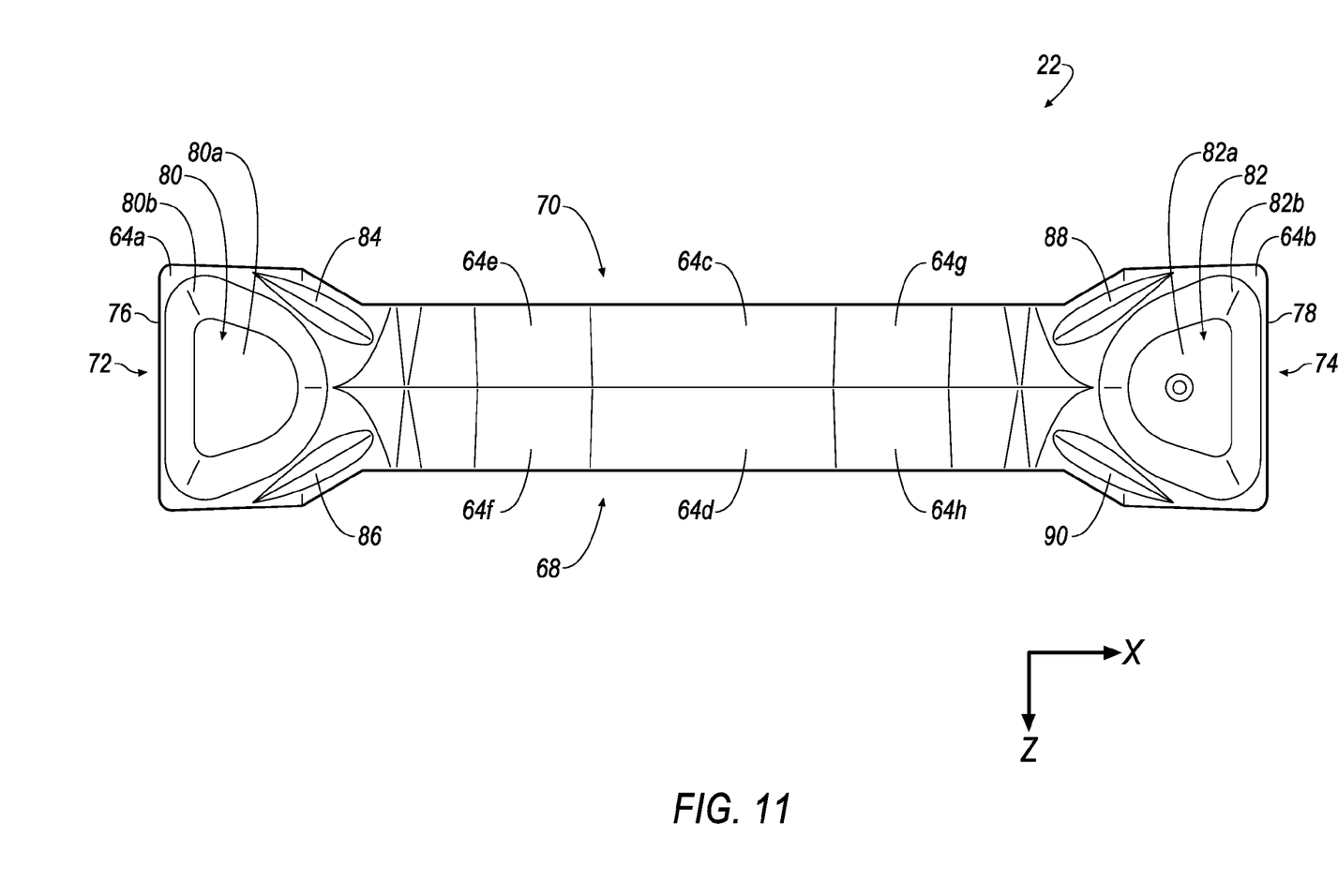
FIG. 11 is a top view of the cutting insert of FIG. 8.
Figure 12:
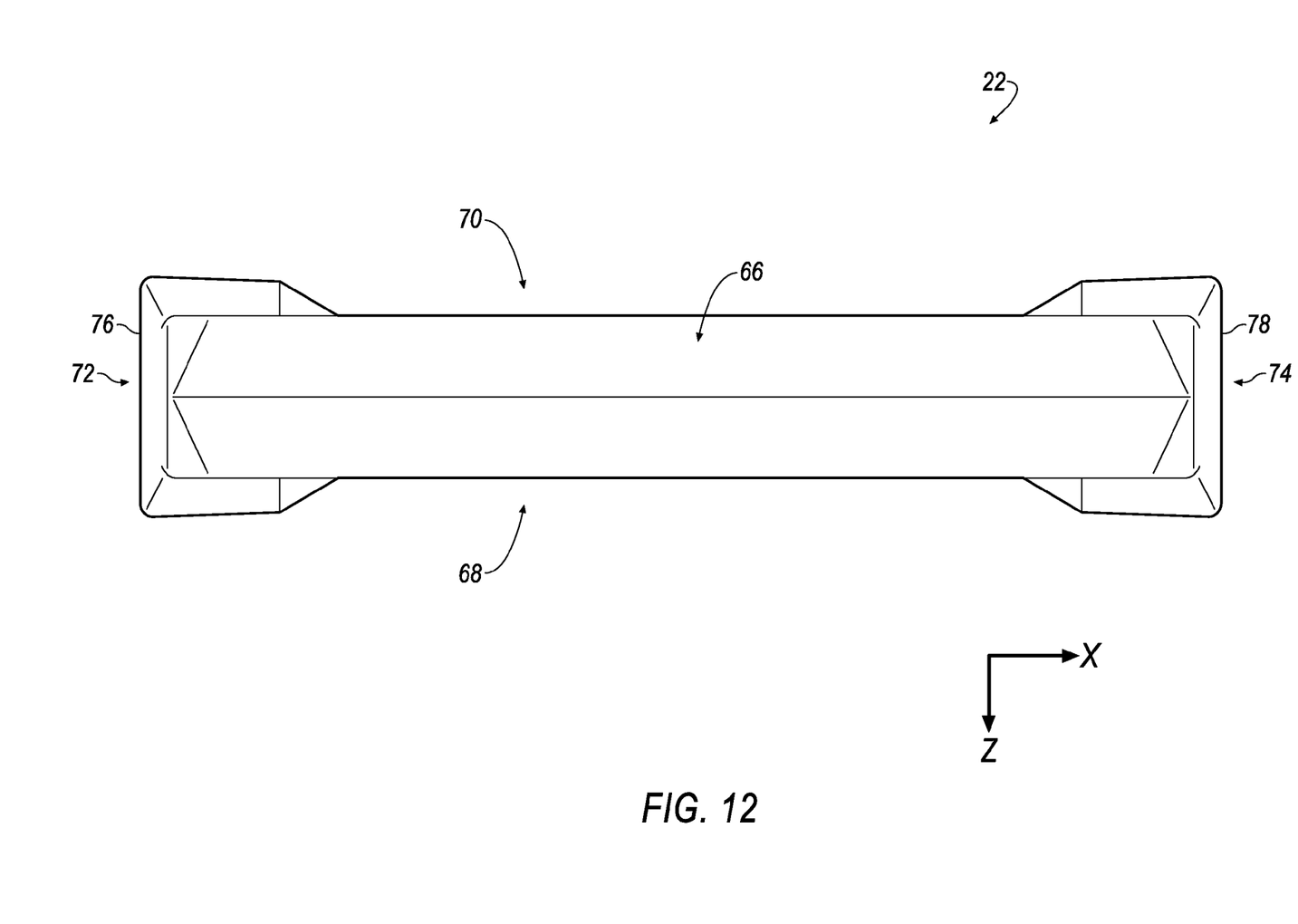
FIG. 12 is a bottom view of the cutting insert of FIG. 8.
Figure 13:
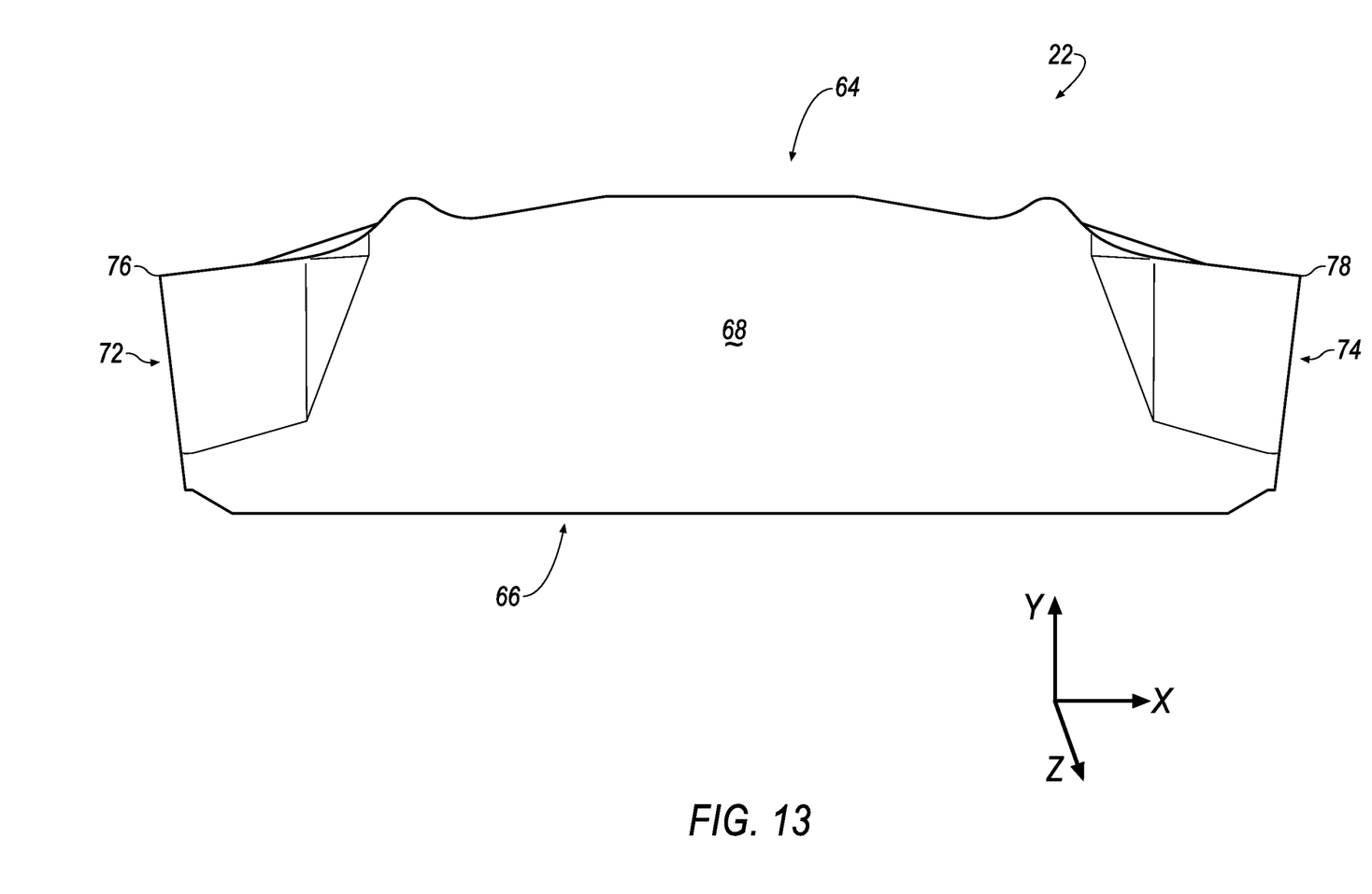
FIG. 13 is a side view of the cutting insert of FIG. 8.
Figure 14:
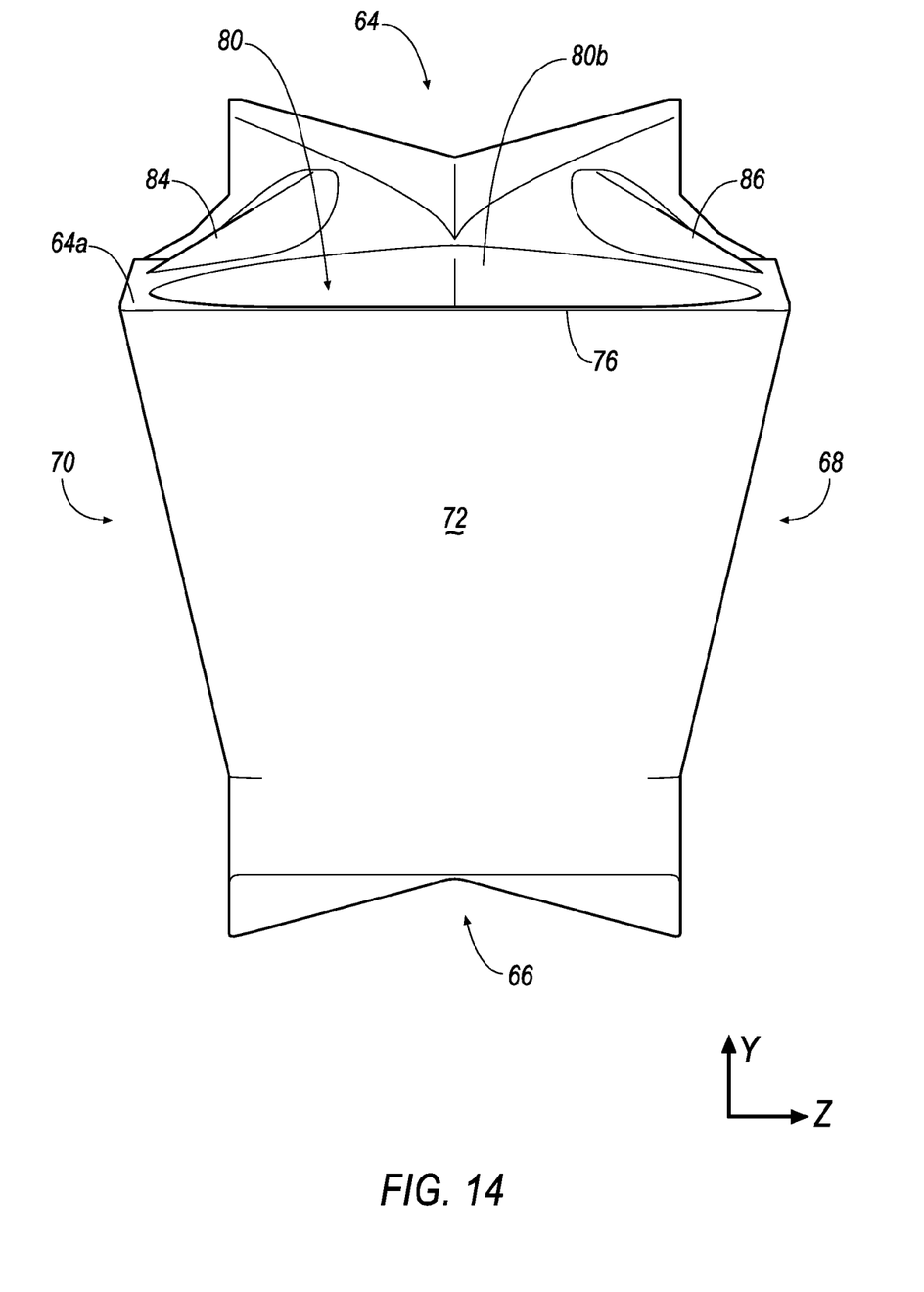
FIG. 14 is an end view of the cutting insert of FIG. 8.

It is noted that the edge at the intersection of the surfaces 64e, 64f and the side surfaces 68, 70, respectively, is not substantially parallel to the longitudinal axis (x-axis), but slope downward from the surfaces 64c, 64d toward the cutting end 76 of the insert 22, as shown in FIGS. 9 and 13. Similarly, because the cutting insert 22 is symmetric about the z-axis, the edge at the intersection of the surfaces 64g, 64h and the side surfaces 68, 70, respectively, is not substantially parallel to the longitudinal axis (x-axis), but slope downward from the surfaces 64c, 64d toward the cutting end 78 of the insert 22.

One aspect of the invention is that the clamping surfaces 64e, 64f, 64g, 64h are engaged by the clamping surfaces 42b, 42c of the cantilevered clamping member 24, thereby clamping the cutting insert 22 into the pocket 20 of the slotting cutter 10. More specifically, the clamping surfaces 64e, 64f of the cutting insert 22 are engaged by the clamping surfaces 42b, 42c of the cantilevered clamping member 24 when the cutting edge 76 is being used during a cutting operation. Similarly, the angled clamping surfaces 64g, 64h of the cutting insert 22 are engaged by the clamping surfaces 42b, 42c of the cantilevered clamping member 24 when the cutting edge 78 is being used during a cutting operation. It has been found that the interaction between the angled clamping surfaces 64e, 64f, 64g, 64h of the cutting insert 22 and the clamping surfaces 42b, 42c of the cantilevered clamping member 24 help draw the cutting insert 22 back into the pocket 20. It has been found that conventional cutting inserts without the angled surfaces 64e, 64f, 64g, 64h interacting with the clamping surfaces 42b, 42c of the cantilevered clamping member 24 have a tendency to move out of the pocket 20 during a cutting operation.

The cutting insert 22 also includes a chip forming feature 80 proximate the cutting edge 76 at one end, and another chip forming feature 82 proximate the cutting edge 78 at the other end. In the illustrated embodiment, the chip forming features 80, 82 are in the form of a dish shape or bowl shape having a substantially planar bottom surface 80a, 82a circumscribed by an arcuate-shaped surface 80b, 82b. The dish shape or bowl shape helps curl the chip formed during a cutting operation.

The cutting insert 22 also includes a pair of chip forming features 84, 86 proximate the chip forming feature 80, and a pair of chip forming features 88, 90 proximate the chip forming feature 82. In the illustrated embodiment, the chip forming features 84, 86, 88, 90 are in the form of a raised football-shaped protrusion that helps deflect the chip upward and away from the slotting cutter 10, thereby protecting the slotting cutter 10 from chips.

The patents and publications referred to herein are hereby incorporated by reference.

Having described presently preferred embodiments the invention may be otherwise embodied within the scope of the appended claims.

The invention claimed is:

1. A slotting cutter, comprising:
a disc-like cutter body rotatable in a predetermined direction on a central axis perpendicular to a plane of the cutter body, the cutter body also includes an upper cam slot defined by a pair of opposing lower and upper surfaces, a lower slot defined by a pair of opposing lower and upper surfaces, and a stop slot disposed between the upper cam slot and the lower slot and defined by a pair of opposing, curved lower and upper surfaces, each slot adapted to engage a wrench; and
a cantilevered clamping member having a bottom surface adapted to engage clamping surfaces on a top surface of a cutting insert when the cutting insert is mounted in a pocket of the slotting cutter.

2. The slotting cutter according to claim 1, wherein the surface of the upper cam slot is formed with a radius that is progressively larger in a radially inward direction of the cutter body, thereby forming a spiral-shaped surface.

3. The slotting cutter according to claim 1, wherein the bottom surface of the cantilevered clamping member includes a pair of clamping surfaces adapted to engage the clamping surfaces on the top surface of the cutting insert.

4. The slotting cutter according to claim 1, wherein the pocket includes a rearward surface, a seating surface and a corner pocket relief at the intersection between the rearward surface and the seating surface.

5. The slotting cutter according to claim 1, wherein the cantilevered clamping member is formed by cutting a pair of slots in the cutter body.

6. The slotting cutter according to claim 5, wherein each slot terminates in a rounded recess that provides stress relief for the cantilevered clamping member.

7. The slotting cutter according to claim 1, wherein the wrench includes a head portion with a slot, two fixed pins and a third, floating pin disposed between the two fixed pins, the pins extending through the slot.

8. The slotting cutter according to claim 7, wherein the two fixed pins are adapted to be received in the upper cam slot and the lower slot of the cutter body, and wherein the third, floating pin is adapted to be received in the stop slot of the cutting body.

9. The slotting cutter according to claim 8, wherein the upper and lower surfaces of the stop slot engage the third, floating pin of the wrench, thereby preventing any further travel of the wrench during use.

10. The slotting cutter according to claim 1, wherein the bottom surface of the cantilevered clamping member further includes a guide disposed radially inward with respect to the clamping surfaces.

11. A cutting insert for a slotting cutter, comprising:
a top surface, a bottom surface and a plurality of side surfaces;
a first cutting edge formed at the intersection between a rake surface on the top surface and one of the side surfaces, and a second cutting edge formed at the intersection between a rake surface on the top surface and another one of the side surfaces,
wherein the top surface of the cutting insert includes a central portion, a first pair of clamping surfaces at one end of the central portion that are angled toward each other, and a second pair of clamping surfaces at an opposite end of the central portion that are angled toward each other, the first and second pair of clamping surfaces sloping downward from the central portion toward a respective cutting edge, and
wherein one of the first and second pair of clamping surfaces of the cutting insert are contacted by a pair of clamping surfaces of a cantilevered clamping member of a slotting cutter to draw the cutting insert into a pocket of the slotting cutter when the first cutting edge is being used during a cutting operation, and wherein the other one of the first and second pair of clamping surfaces are contacted by the pair of clamping surfaces of the cantilevered clamping member of the slotting cutter to draw the cutting insert into the pocket of the slotting cutter when the second cutting edge is being used during a cutting operation.

12. The cutting insert according to claim 11, further including a bowl-shaped chip forming feature proximate the rake surface on the top surface.

13. The cutting insert according to claim 12, further including a raised football-shaped chip forming feature proximate the bowl-shaped chip forming feature.

* * * * *